United States Patent [19]

Yoshida et al.

[11] Patent Number: 5,153,112
[45] Date of Patent: Oct. 6, 1992

[54] METHOD OF PROCESSING SILVER HALIDE PHOTOGRAPHIC MATERIALS

[75] Inventors: Kazuhiro Yoshida; Syoji Nishio, both of Hino, Japan

[73] Assignee: Konica Corporation, Tokyo, Japan

[21] Appl. No.: 607,622

[22] Filed: Oct. 31, 1990

Related U.S. Application Data

[63] Continuation of Ser. No. 402,775, Sep. 5, 1989, abandoned.

[30] Foreign Application Priority Data

Sep. 5, 1988 [JP] Japan ................................. 63-223178

[51] Int. Cl.$^5$ ................................. G03C 5/18
[52] U.S. Cl. ................................. 430/428; 430/264; 430/432; 430/434; 430/446; 430/522; 430/634; 430/635; 430/636; 430/963; 430/350; 430/352
[58] Field of Search ............... 430/264, 428, 432, 434, 430/446, 522, 634, 635, 636, 963, 350, 352

[56] References Cited

U.S. PATENT DOCUMENTS

| | | | |
|---|---|---|---|
| H674 | 5/1989 | Nagasaki et al. | 430/496 |
| 2,493,747 | 1/1950 | Brooker et al. | 430/577 |
| 4,030,924 | 6/1977 | Hofman | 430/963 |
| 4,444,876 | 4/1984 | Mackawa et al. | 430/635 |
| 4,797,349 | 1/1989 | Takahashi et al. | 430/636 |
| 4,839,265 | 6/1989 | Ohno et al. | 430/522 |
| 4,963,476 | 10/1990 | Sugimoto et al. | 430/636 |
| 4,988,610 | 1/1991 | Pitt et al. | 430/634 |

*Primary Examiner*—Charles L. Bowers, Jr.
*Assistant Examiner*—Thomas R. Neville
*Attorney, Agent, or Firm*—Finnegan, Henderson, Farabow, Garrett and Dunner

[57] ABSTRACT

The improved method of processing a silver halide photographic material that has at least one light-sensitive silver halide emulsion layer on one side of a support and which has at least one back coating layer on the other side of the support is characterized in that said silver halide photographic material contains at least one specific dye and at least one anionic surfactant and the development, fixing, washing and/or stabilizing steps are performed within a time period of 40 seconds and at a line speed of at least 1,500 mm/min. The method is capable of processing the silver halide photographic material without producing either substantial or uneven color remnant.

27 Claims, No Drawings

METHOD OF PROCESSING SILVER HALIDE PHOTOGRAPHIC MATERIALS

This application is a continuation, of application Ser. No. 07/402,775 filed Sep. 5, 1989, now abandoned.

BACKGROUND OF THE INVENTION

The present invention relates to a method of processing silver halide photographic materials. More particularly, the present invention relates to a method of processing printing light-sensitive materials adapted for rapid development.

The consumption of silver halide photographic materials is constantly increasing today. This has caused an increase in the volume of silver halide photographic materials to be processed, with subsequent recognition of the need for processing photographic materials with greater rapidity, or increasing the volume of photographic materials that can be processed within a given time.

A similar tendency is found in the making of printing plates. With the recent demand for realtime processing of information and with the rapid increase in the frequency of information processing, a need has arisen for plate-makers to supply their products to users within a short period of time and yet with a greater number of plates being processed. In order to satisfy this need of plate-makers, it has been necessary not only to further simplify the overall printing process but also to process plate-making films with even greater rapidity. However, as it turned out, if the speed of photographic processing is simply increased and, in particular, if the length of processing line is shortened with a view to accomplishing rapid access photography of a kind in which development, fixing and washing and/or stabilizing steps are completed within a duration of 40 seconds, the processed photographic materials experience increased color remnant or unevenness in color remnant.

SUMMARY OF THE INVENTION

An object, therefore, of the present invention is to provide a method by which silver halide photographic materials which have been exposed to light in a conventional manner can be processed with extreme rapidity and yet without suffering from substantial color remnant after processing.

This object of the present invention can generally be attained by a method of processing a silver halide photographic material that has at least one light-sensitive silver halide emulsion layer on one side of a support and which has at least one back coating layer on the other side of the support. Stated more specifically, said silver halide photographic material contains at least one dye represented by the following general formula (I) and at least one anionic surfactant and the development, fixing and washing and/or stabilizing steps are performed within a time period of 40 seconds and at a line speed of at least 1,500 mm/min:

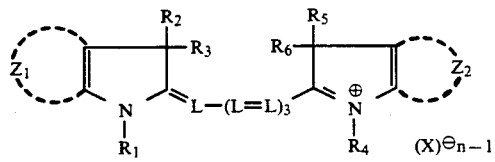

(I)

where $R_1$, $R_2$, $R_3$, $R_4$, $R_5$ and $R_6$ which may be the same or different each independently represents a substituted or unsubstituted alkyl group; $Z_1$ and $Z_2$ each represents the nonmetallic atomic group necessary to form a substituted or unsubstituted benzo or naphto condensed ring, provided that $R_1$-$R_6$ as well as $Z_1$ and $Z_2$ each represents a group that enables the dye molecule to have at least four acid groups; L is a substituted or unsubstituted methine group; $X\ominus$ is an anion; n is 1 or 2, provided that the dye forms an intramolecular salt when n is 1.

DETAILED DESCRIPTION OF THE INVENTION

Photographic processing according to the present invention is performed at a line speed of at least 1,500 mm/min. The method of the present invention will prove effective even if the line speed is 1,800 mm/min or higher and in particular, at 2,000 mm/min or higher. Another requirement of the present invention is that processing including development, fixing and washing and/or stabilizing steps should be completed within a period of 40 seconds and this means that it should take no more than 40 seconds for the tip of a film entering the developing solution to emerge from the wash water and/or stabilizing solution after passing through the fixing solution. The time of 40 seconds includes the respective solution crossover times. According to the present invention, the processing line speed can be increased without shortening the line length and the object of the present invention can be attained by processing a photographic material without suffering the problems already described in connection with the prior art.

The dyes represented by the general formula (I) are described below In the general formula (I), $R_1$, $R_2$, $R_3$, $R_4$, $R_5$ and $R_6$ which may be the same or different each independently represents a substituted or unsubstituted alkyl group, and $Z_1$ and $Z_2$ each represents the nonmetallic atomic group necessary to form a substituted or unsubstituted benzo or naphtho condensed ring. It should however be noted that $R_1$-$R_6$ as well as $Z_1$ and $Z_2$ each represents a group that enables the dye molecule to have at least four acid groups. In other words, at least four of the groups represented by $R_1$-$R_6$ and $Z_1$ and $Z_2$ have an acid substituent (e.g. a sulfonic acid or carboxylic acid group.) It is particularly preferred that $R_1$-$R_6$ as well as $Z_1$ and $Z_2$ each represents a group that enables the dye molecule to have four sulfonic acid groups.

The term "sulfonic acid group" as used herein covers a sulfo group or salts thereof, and the term "carboxylic acid group" covers a carboxyl group or salts thereof. Exemplary salts of a sulfo group and a carboxyl group include salts of alkali metals such as Na and K, as well as ammonium salts and organic ammonium salts such as triethylamine, tributylamine and pyridine.

In the general formula (I), L represents a substituted or unsubstituted methine group, and $X\ominus$ represents an anion. Specific examples of anion represented by $X\ominus$ include halide ions (e.g. Cl− and Br−), p-toluenesulfonic acid ion and ehtylsulfuric acid ion. In the general formula (I), n represents 1 or 2 and when the dye forms an intramolecular salt, n is 1.

The alkyl group represented by each of $R_1$-$R_6$ is preferably a lower alkyl group with 1-5 carbon atoms, such as methyl, ehtyl, n-propyl, n-butyl, isopropyl or n-pentyl. It may have a substituent such as a sulfonic acid group, a carboxylic acid group or a hydroxyl group. More preferably, $R_1$ and $R_4$ each represents a lower alkyl group of $C_{1-5}$ having a sulfonic acid group such as 2-sulfoethyl, 3-sulfopropyl or 4-sulfobutyl.

The benzo or naphtho condensed ring that is formed by the non-metallic group represented by each of $Z_1$ and $Z_2$ may have a substituent exemplified by, for example, a sulfonic acid group, a corboxylic acid group, a hydroxyl group, a halogen atom (e.g. F, Cl or Br atom), a cyano group, a substituted amino group [e.g. dimethylamino, diethylamino, ethyl-4-sulfobutyl or di-(3-sulfopropyl) amino], a substituted or unsubstituted alkyl group of $C_{1-5}$ that is bonded to the ring either directly or via a divalent linkage (e.g. methyl, ehtyl, propyl or butyl, which may have a substituent such as a sulfonic acid group, a carboxylic acid group or a hydroxyl group), with preferred examples of the divalent linkage including —O—, —NHCO—, —NHSO$_2$—, —NHCOO—, —NHCONH—, —COO—, —CO— and —SO$_2$—.

The methine group represented by L may have a substituent such as a substituted or unsubstituted lower alkyl group of $C_{1-5}$ (e.g. methyl, ehtyl, 3-hydroxypropyl, benzyl or 2-sulfoethyl), a halogen atom [e.g. F, Cl or Br), a substituted or unsubstituted aryl group (e.g. phenyl or 4-chlorophentyl) or a lower alkoxy group (e.g. methoxy or ethoxy).

The substituents on the methine group represented by L may combine with one another to form a 6-membered ring having three methine groups (e.g. 4,4-dimethylcyclohexene ring).

The following are non-limiting examples of the dye compounds of the general formula (I) which may be used in the present invention.

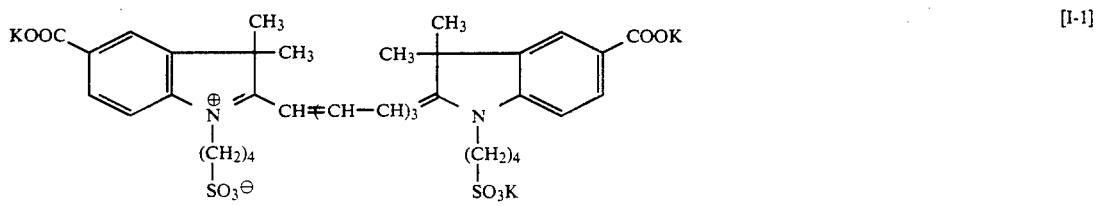
[I-1]

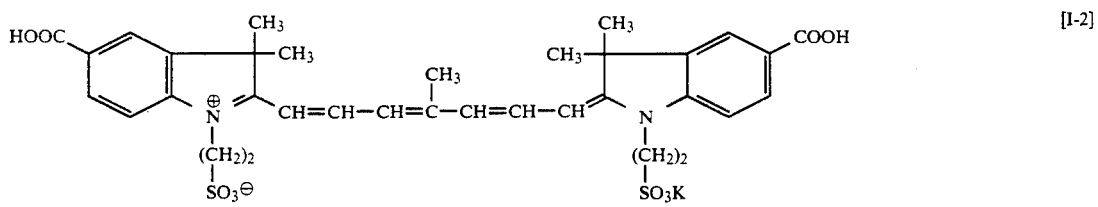
[I-2]

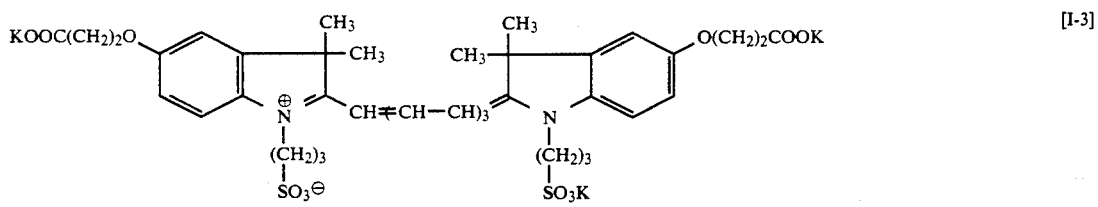
[I-3]

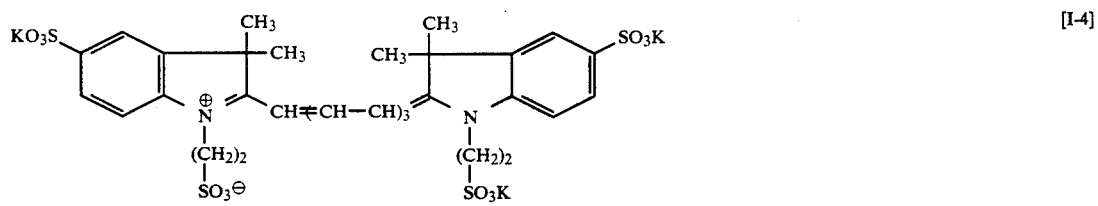
[I-4]

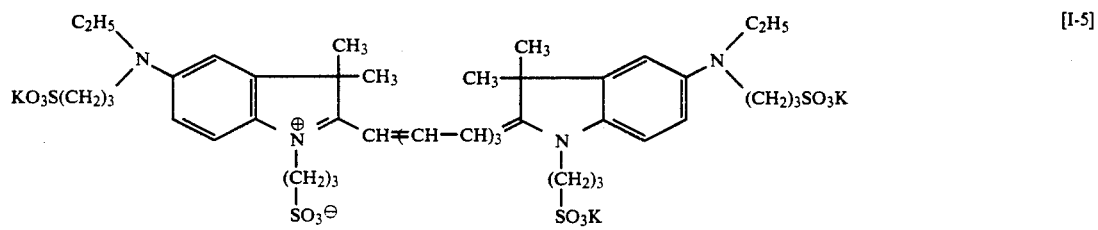
[I-5]

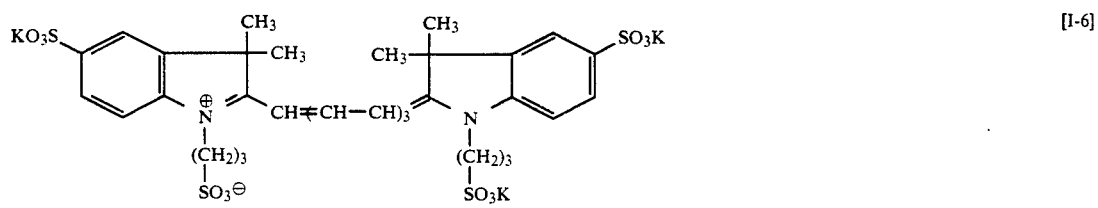
[I-6]

-continued
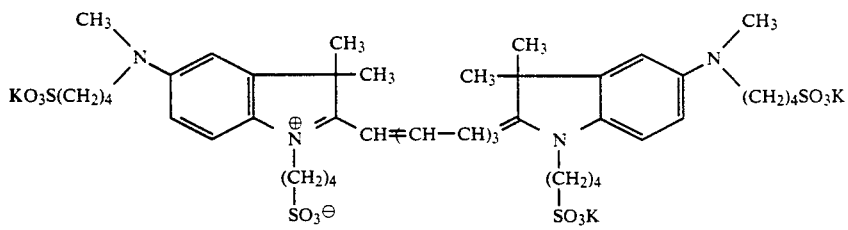
[I-7]
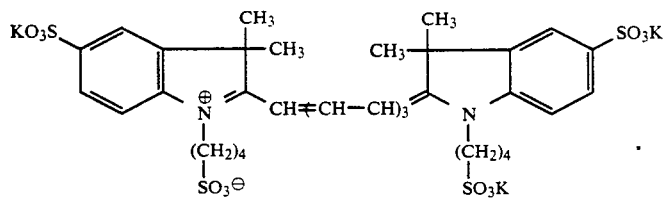
[I-8]
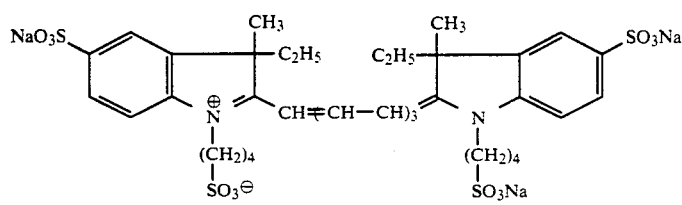
[I-9]
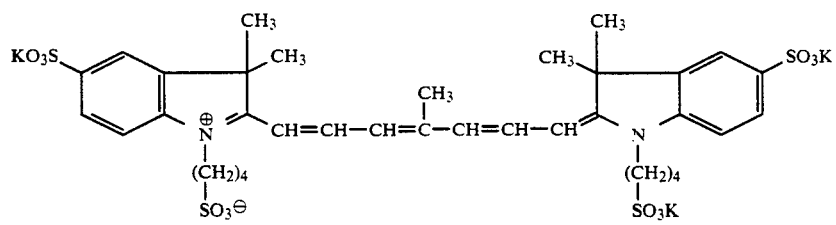
[I-10]
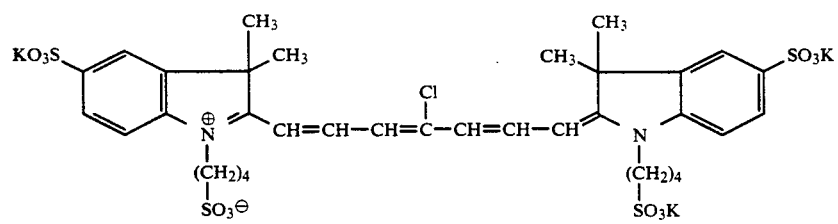
[I-11]
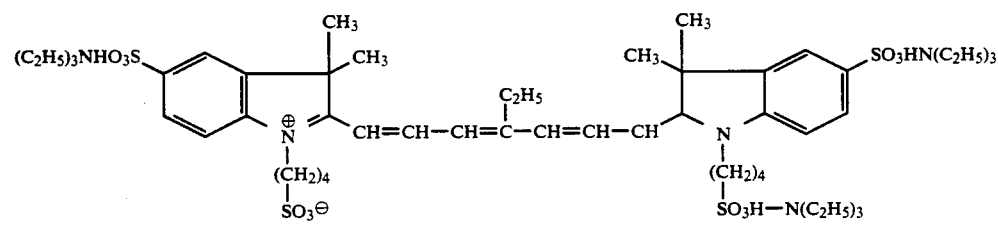
[I-12]
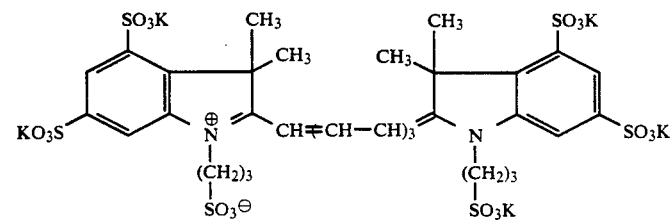
[I-13]

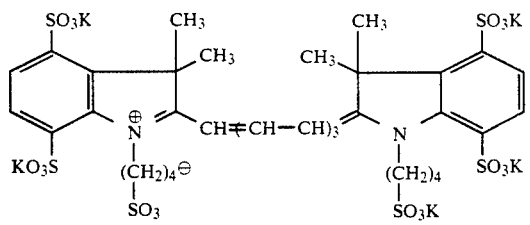
[I-14]
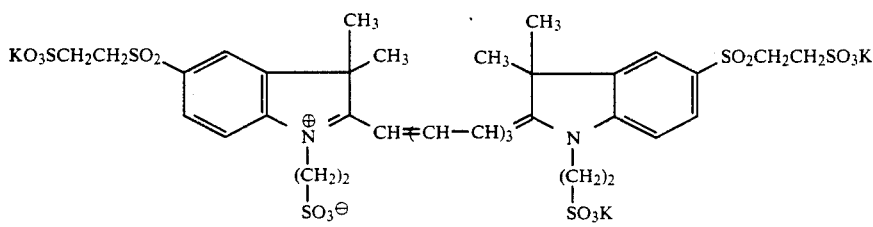
[I-15]
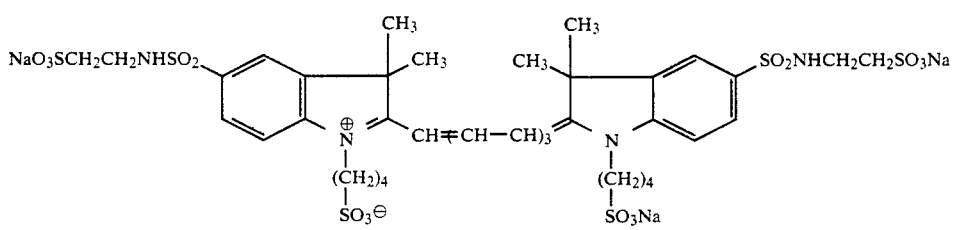
[I-16]
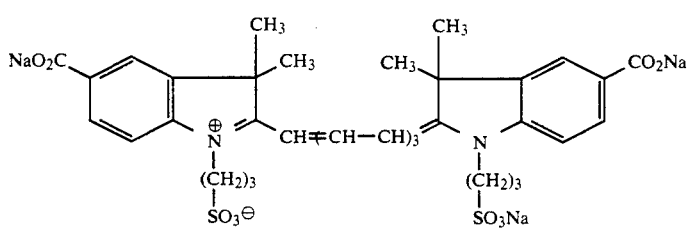
[I-17]
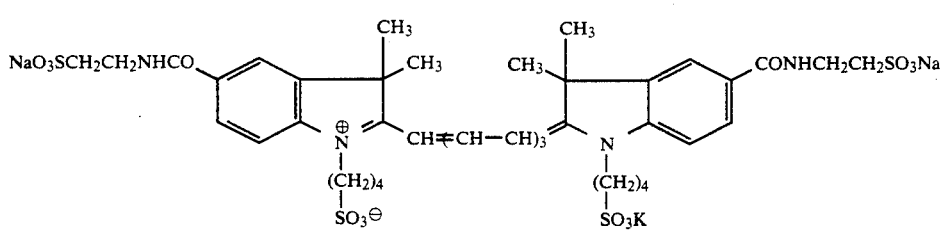
[I-18]
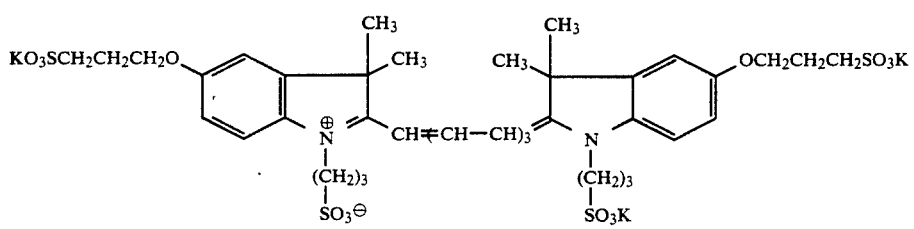
[I-19]
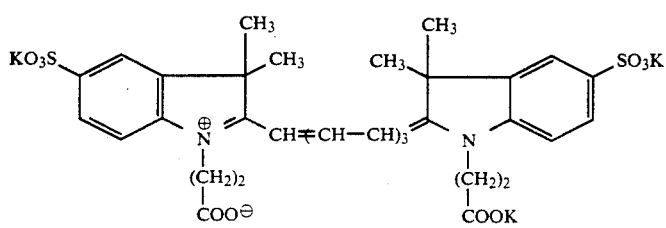
[I-20]

-continued

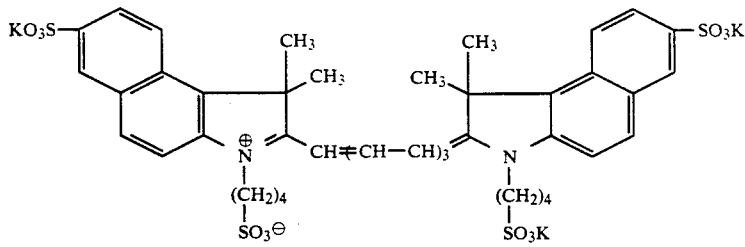

[I-21]

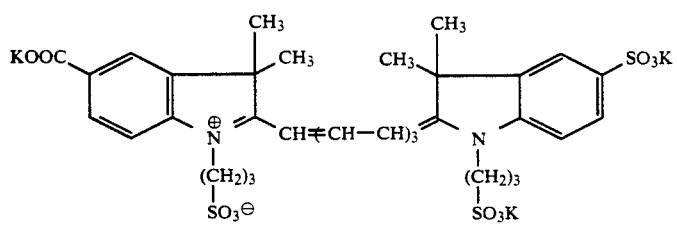

[I-22]

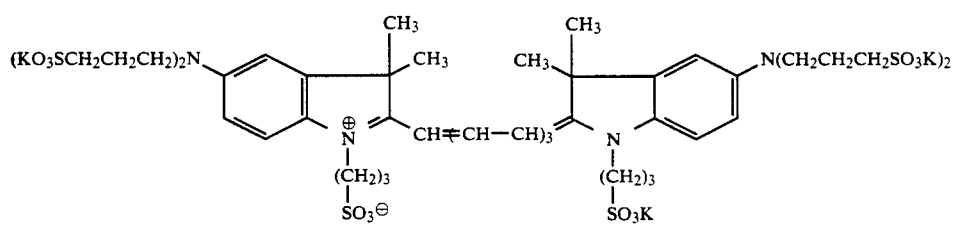

[I-23]

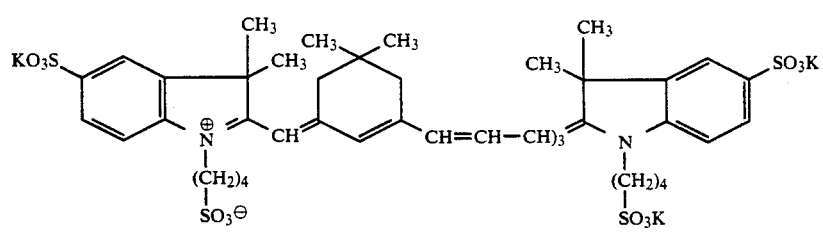

[I-24]

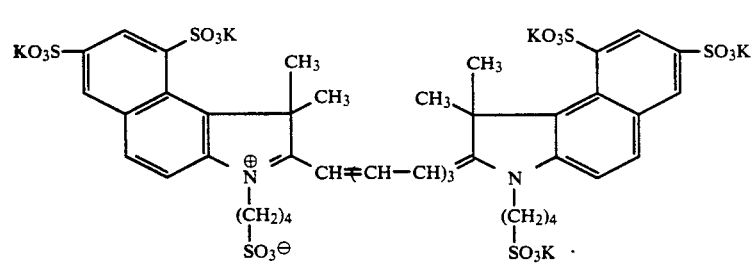

[I-25]

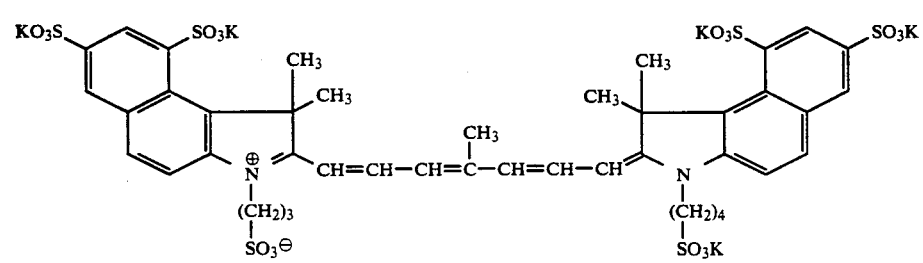

[I-26]

The dyes represented by the general formula (I) have a maximum absorption in the wavelength range of 730–850 nm and can be synthesized by making reference to J. Chem. Soc. 189 (1933) and U.S. Pat. No. 2,895, 955.

The dyes listed above are added to coating solutions for hydrophilic colloidal layers after being dissolved in suitable solvents such as water, alcohols (e.g. methanol and ethanol), methyl cellosolve and mixtures thereof.

These dyes may be used either on their own or as admixtures.

The content of these dyes varies with the specific object of use and cannot be determined uniquely but normally the preferred level may be found within the range of $10^{-3}$ to 0.5 g/m², with the range of $10^{-2}$ to 0.2 g/m² being particularly preferred.

The dyes represented by the general formula (I) are particularly effective for the purpose of preventing irradiation and if they are to be used for this purpose, they are typically incorporated in at least one of the silver halide emulsion layers.

The dyes are also effective for preventing halation and if they are to be used for this purpose, they are incorporated in at least one layer on the back side of a support or in at least one layer between the support and an overlying silver halide emulsion layer.

These dyes are also effective in ensuring compatibility with the safelight and if they are to be used for this purpose, they are incorporated in at least one layer that is more remote from the support than silver halide emulsion layers.

In the silver halide photographic material to be used in the present invention, the gelatin content of the side of the material that incorporates the dyes of (I) is preferably 3.9 g/m² or below, more preferably 3.5 g/m² or below.

The anionic surfactant to be used in the present invention may be of any type that has both a hydrophobic and a hydrophilic portion in the molecule and which, when in solution, exhibits a lower surface tension.

At least one of the compounds represented by the following general formulas (IIA), (IIB), (IIC) and (IID) may preferably be used as an anionic surfactant:

where $R^1$, $R^2$, $R^4$, $R^5$, $R^6$, $R^8$, $R^9$ and $R^{10}$ which may be the same or different each independently represents a halogen atom (e.g. Cl or Br) or an alkyl group (e.g. methyl, ethyl, butyl, isobutyl, pentyl, hexyl, octyl, nonyl, decyl, dodecyl, or octadecyl). The alkyl group may be straight-chained or branched and those having 1-32 carbon atoms are preferred. Such alkyl groups may have an appropriate substituent such a a halogen atom (e.g. Cl or Br atom) or an aryl group (e.g. phenyl or naphthyl). In formulas (IIA)-(IID), $R^3$ and $R^7$ each represents an alkali metal salt of a carboxyl group, a sulfo group or a phosphonic acid group, and $n_1$ and $n_2$ each represents an integer of 1-3.

The following are non-limiting examples of the compounds represented by the general formulas (IIA)-(IID).

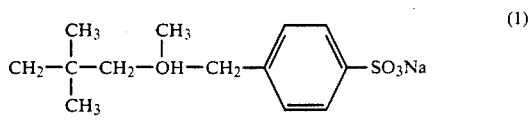

(1)

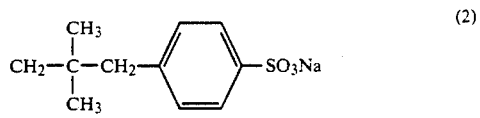

(2)

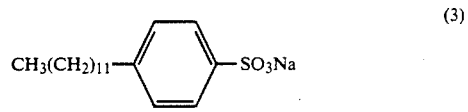

(3)

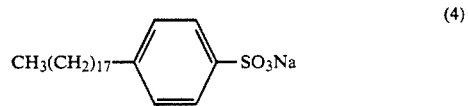

(4)

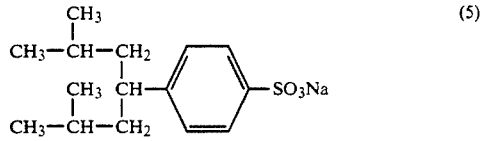

(5)

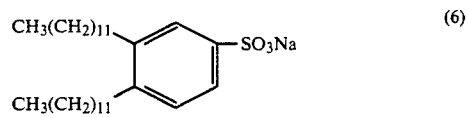

(6)

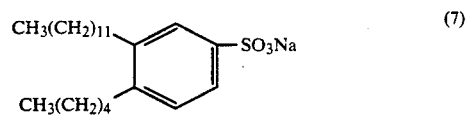

(7)

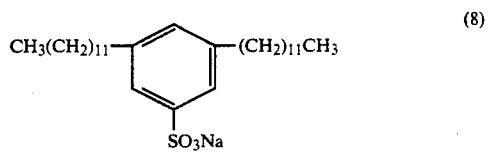

(8)

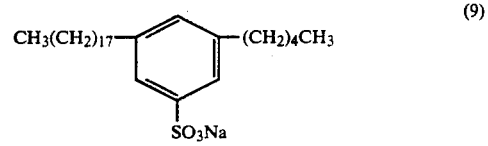

(9)

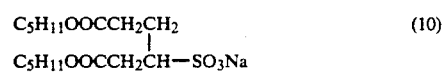

(10)

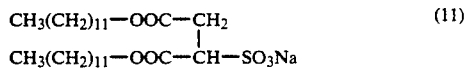

(11)

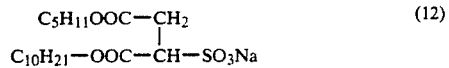

(12)

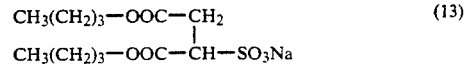

(13)

-continued $CH_3(CH_2)_3-CH(C_2H_5)CH_2-OOC-CH_2$
$CH_3(CH_2)_3-CH(C_2H_5)CH_2-OOC-CH-SO_3Na$ (14)

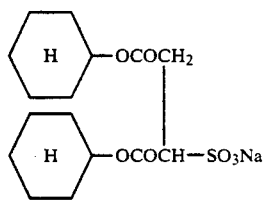 (15)

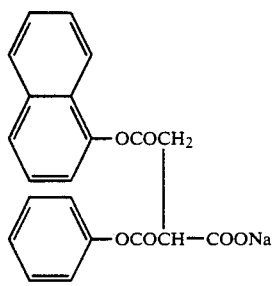 (16)

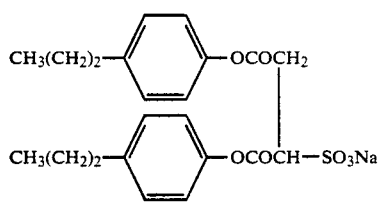 (17)

$CH_3(CH_2)_7-OCO-CH_2$
$CH_3(CH_2)_7-OCO-CH$
$CH_3(CH_2)_7-OCO-CH-SO_3Na$ (18)

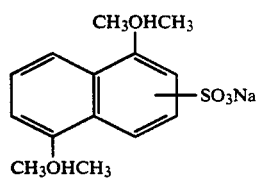 (19)

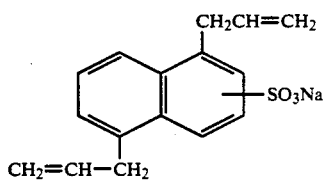 (20)

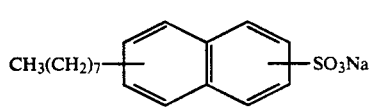 (21)

-continued

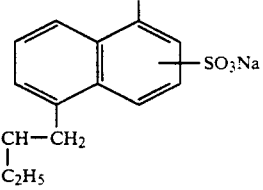 (22)

The anionic surfactant listed above is contained in the silver halide photographic material in an amount of $10^{-4}$ - $1$ g/m$^2$, preferably $10^{-3}$ - $0.1$ g/m$^2$.

The anionic surfactant can be contained in at least one layer on the side of the support on which at least one layer containing a dye of the general formula [I] is provided.

The silver halide emulsion for use in the photographic materials that are to be processed by the present invention may contain any kind of silver halides that are used in ordinary silver halide emulsions, such as silver bromide, silver chloride, silver iodobromide, silver chlorobromide and silver chloroiodobromide. The silver halide grains used in the silver halide emulsion may be prepared by either the acid method, neutral method or ammoniacal method.

The silver halide grains used in the present invention may have a uniform distribution of silver halide composition throughout the grain; alternatively, they may be core/shell grains having different silver halide compositions in the interior and surface layer of the grain. The silver halide grains may be either such that latent image is predominantly formed on their surface or such that it is predominantly formed within the grain. The silver halide grains may assume a desired shape and a preferred example is a cubic crystal the surface of which is bound by (100) planes. If desired, octahedral, tetradecahedral, dodecahedral and otherwise shaped grains that are formed by the methods described in such patents as U.S. Pat. Nos. 4,183,756, 4,225,666, JP-A-55-26589 (the term "JP-A" as used herein means an "unexamined published Japanese patent application") and JP-B-55-42737 (the term "JP-B" as used therein means an "examined Japanese patent publication") and in such references as J. Photogr. Sci., 21, 39 (1973) may be employed. Grains having twin planes may also be used.

Silver halide grains to be used in the present invention may have single crystallographic forms or admixtures of various crystallographic forms.

The silver halide emulsion used in the present invention may have any grain size distribution. It may have a broad grain size distribution (hereinafter referred to as a "polydispersed emulsion"). Alternatively, emulsions having a narrow grain size distribution (hereinafter referred to as "monodispersed emulsions") may be used either on their own or as admixtures. If desired, polydispersed emulsions may be used in combination with monodispersed emulsions.

Two or more silver halide emulsions prepared separately may be used as admixtures.

The present invention favors the use of monodispersed emulsions. The monodispersed silver halide grains in the monodispersed emulsion are preferably such that the silver halide grains having sizes within ±20% of the average grain size f account for at least 60%, preferably at least 70%, more preferably at least 80%, of the total weight of the grains present. The "average grain size $\bar{r}$" is defined as the grain size ri for the case where the product of ni and $ri^3$ attains a maximum value (in $ni \times ri^3$, ni represents the frequency of the occurrence of grains having the size ri) and is expressed in three significant figures, with the last figure remaining after dropping insignificant figures being rounded off. The term "grain size" as used here means the diameter of a spherical silver halide grain, or the diameter of the projected area of a nonspherical grain as reduced to a circular image of the same area.

The grain size can be determined by direct measurement of the grains of interest or their projected areas on a print obtained by photographic imaging of the grains under an electron microscope at a magnification of $1-5 \times 10^4$, with no less than 1,000 grains being counted at random.

Highly monodispersed emulsions are particularly preferred for use in the present invention and they have a degree of monodispersity [i.e. (S.D. of ri)/$\bar{r} \times 100$]of no higher than 20, more preferably no higher than 15. The average grain size ($\bar{r}$) and the standard deviation of grain size (S.D. of ri) shall be determined from the already-defined ri. Such highly monodipersed emulsions may be obtained by making reference to patents such as JP-A-54-48521, 58-49938 and 60-122935.

Light-sensitive silver halide emulsions may be used as "primitive" emulsions without being chemically sensitized but in the more usual case, they are subjected to chemical sensitization, which may be performed by the methods described in Glafkides, Zelikman et al., and H. Frieser, "Die Grundlagen der Photographischen Prozesse mit Silberhalogeniden", Akademische Verlagsgesellschaft, 1968. Stated more specifically, chemical sensitization may be effected by sulfur sensitization using sulfur-containing compounds or activated gelatin which are capable of reacting with silver ion, by reduction sensitization using reducing materials, or by noble metal sensitization using gold or other noble metals. Illustrative sulfur sensitizers include thiosulfates, thioureas, thiazoles, rhodanines and other compounds. For specific examples of such sulfur sensitizers, see U.S. Pat. Nos. 1,574,944, 2,410,689, 2,278,947, 2,728,668 and 3,656,955. Illustrative reduction sensitizers include stannous salts, amines, hydrazine derivatives, formamidosulfinic acid and silane compounds. For specific examples of such reduction sensitizers, see U.S. Pat. Nos. 2,487,850, 2,419,974, 2,518,698, 2,983,609, 2,983,610 and 2,694,637. For noble metal sensitization, not only gold complex salts but also complex salts of metals of group VII of the periodic table (e.g. platinum, iridium and palladium) may be used and specific examples are described in such patents as U.S. Pat. Nos. 2,399,083, 2,448,060 and British Patent No. 618,061.

The pH, pAg, temperature and other conditions of chemical sensitization are not limited to any particular values but the following guide figures may be given: a pH of 4–9, preferably 5–8; a pAg of 5–11, preferably 7–9; and a temperature of 40°–90° C., preferably 45°–75° C.

The sulfur sensitization or gold-sulfur sensitization described above may be combined with reduction sensitization or noble metal sensitization to chemically sensitize the photographic emulsion.

The light-sensitive emulsions described above may be used either independently or as admixtures.

After completion of the chemical sensitization described above, 4-hydroxy-6-methyl-1,3,3a,7-tetraazaindene, 5-mercapto-1-phenyl-tetraazole, 2-mercaptobenzothiazole and various other stabilizers may be used in the present invention. If necessary, silver halide solvents such as thioether or crystal habit modifiers such as mercapto group containing compounds and sensitizing dyes may also be employed.

In the process of formation and/or growth of silver halide grains, metal ions may be added in the form of cadmium, zinc, lead, thallium or iridium salt (or a complex salt containing the same), a rhodium salt (or a complex salt containing the same) or an iron salt (or a complex salt containing the same) so that these metallic elements may be present within and/or on the grains.

In the preparation of silver halide emulsions to be used in the present invention, unwanted soluble salts may be removed after completion of the growth of silver halide grains. If desired, such soluble salts may be left unremoved from the grown silver halide grains. Removal of such soluble salts may be accomplished by the method described under Research Disclosure No. 17643.

Special sensitizers may also be added to the silver halide photographic material to be processed by the present invention. Applicable dyes include cyanine dyes, merocyanine dyes, complex cyanine dyes, complex merocyanine dyes, holopolar cyanine dyes, hemicyanine dyes, styryl dyes and hemioxanole dyes. Particularly useful dyes are those which are classified as cyanine dyes, merocyanine dyes and complex merocyanine dyes. These dyes may contain any of the nuclei that are customarily used as basic heterocylic nuclei in cyanine dyes. Specific examples of such nuclei include: a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus and a pyridine nucleus; nuclei having alicyclic hydrocarbon rings fused to these nuclei; and nuclei having aromatic hydrocarbon rings fused to these nuclei, as exemplified by an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus and a quinoline nucleus. These nuclei may have one or more substituents on the carbon atom.

Merocyanine or complex merocyanine dyes may contain nuclei having a ketomethylene structure and such nuclei include 5- or 6-membered heterocyclic nuclei as exemplified by a pyrazolin-5-one nucleus, a thiohydantoin nucleus, a 2-thioxazolidine-2,4-dione nucleus, a thiazolidine-2,4-dione nucleus, a rhodanine nucleus and a thiobarbituric acid nucleus.

If spectral sensitizers are to be used in the present invention, their concentrations should be comparable to those employed in ordinary negative-working silver halide emulsions. It is particularly preferred that spectral sensitizers are used at dye concentrations that will not cause a substantial decrease in the intrinsic sensitivity of the silver halide emulsions. Spectral sensitizers are preferably used at concentrations of from ca. $1.0 \times 10^5$ to ca. $5 \times 10^{-4}$ moles, more preferably from ca. $4 \times 10^{-5}$ to ca. $2 \times 10^{-4}$ moles, per mole of silver halide.

The spectral sensitizers described above may be used either on their own or as admixtures. More specific examples of spectral sensitizers that may be used with advantage in the present invention are listed below: those to be used in blue-sensitive silver halide emulsions (see patents such as West German Patent No. 929,080, U.S. Pat. Nos. 2,231,658, 2,493,748, 2,503,776, 2,519,001, 2,912,329, 3,656,956, 3,672,897, 3,694,217, 4,025,349, 4,046,572, British Patent No. 1,242,588, JP-B-44-14030, 52-24844, and JP-A-48-73137 and 61-172140); those to be used in green-sensitive silver halide emulsions as typified by cyanine dyes, merocyanine dyes and complex cyanine dyes of the types described in such patents as U.S. Pat. Nos. 1,939,201, 2,072,908, 2,739,149, 2,945,763, British Patent No. 505,979 and JP-B-48-42172; add those to be used in red-sensitive or infrared-sensitive silver halide emulsions as typified by cyanine dyes, merocyanine dyes and complex cyanine dyes of the types described in such patents as U.S. Pat. Nos. 2,269,234, 2,270,378, 2,442,710, 2,454,629, 2,776,280, JP-B-49-17725, JP-A-50-62425, 61-29836 and 60-80841.

These spectral sensitizers may be used either on their own or as admixtures. Combinations of spectral sensitizers are often used for the purpose of supersensitization and typical examples are described in such patents as U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, 4,026,707, British Patent Nos. 1,344,281, 1,507,803, JP-B-43-4936, 53-12375, and JP-A-52-110618 and 52-109925.

The silver halide photographic material of the present invention may contain water-soluble dyes in hydrophilic colloidal layers either as filter dyes or for attaining various objects such as prevention of irradiation or halation. Such water-soluble dyes include oxonole dyes, hemioxonole dyes, styryl dyes, merocyanine dyes, cyanine dyes, azo dyes, etc. Among these dyes, oxanole dyes, hemioxanole dyes and merocyanine dyes are particularly useful.

Dyes, uv absorbers and other additives present in hydrophilic colloidal layers used as constituent layers of the silver halide photographic material to be processed by the present invention may be mordanted with cationic polymers or the like.

In order to prevent the occurrence of sensitivity drop or fogging during the production, storage or processing of silver halide photographic materials, various compounds may be incorporated in the photographic emulsion described above. Many compounds known as stabilizers may be used for this purpose and they include: azoles such as benzothiazolium salts, nitroindazoles, triazoles, benzotriazoles and benzimidazoles (in particular, those which are substituted by nitro or halogen); heterocyclic mercapto compounds such as mercaptothiazoles, mercaptobenzimidazoles, mercaptothiazoles, mercaptotetrazoles (in particular, 1-phenyl-5-mercaptotetrazole), mercaptopyridines, and those heterocyclic mercapto compounds having water-soluble groups such as a carboxyl group or a sulfone group; mercapto compounds, thioketo compounds such as oxazolinethione; azaindenes such as tetrazaindenes [in particular, 4-hydroxy-substituted(1,3,3a,7) tetrazaindenes]; benzenethiosulfonic acids; and benzenesulfinic acids.

Several examples of the applicable compounds are listed, with pertinent references being also mentioned, in K. Mees, "The Theory of the Photographic Process", 3rd Ed., Macmillan Publishing Co., Inc., 1966.

For more specific examples of the applicable compounds and for the methods of using them, reference may be had to U.S. Pat. Nos. 3,954,474, 3,982,947, 4,021,248 and JP-B-52-28660.

The silver halide photographic material of the present invention may contain alkyl acrylate lattices in photographic constituent layers as described in U.S Pat. Nos. 3,411,911, 3,411,912 and JP-B-45-5331.

The silver halide photographic material to be processed by the present invention may also contain various additives as shown below: a thickener or plasticizer selected from among styrene-sodium maleate copolymer, dextran sulfate, etc. as described in U.S. Pat. No. 2,960,404, JP-B-43-4939, West German Patent Application (DAS) 1,904,604, JP-A-48-63715, Belgian Patent 762,833, U.S. Pat. No. 3,767,410, Belgian Patent 588,143, etc.; a hardener selected from among aldehydes, epoxies, ethyleneimines, activated halogens, vinylsulfones, isocyanates, sulfonate esters, carbodiimides, mucochloric acids, acyloyls, etc.; and a uv absorber selected from among the compounds described in U.S. Pat. No. 3,253,921 and British Patent 1,309,349, in particular, 2-(2'-hydroxy-5-tert-butylphenyl)-benzotriazole, 2-(2'hydroxy-3'-tert -butylphenyl) benzotriazole, 2-(2-hydroxy-3'-tert-butyl-5'butylphenyl)-5-chlorobenzotriazole and 2(2'hydroxy-3',5'-di-tert-butylphenyl)-5-chlorobenzo-triazole. As coating aids, emulsifiers, agents to provide improved permeability of processing solutions and other fluids, antifoaming agents or as surfactants to be used for controlling various physical properties of the light-sensitive material, anionic, cationic, nonionic or amphoteric compounds of the types described in the following patents may be employed: British Patent Nos.

,389, U.S. Pat. Nos. 2,026,202, 3,514,293, JP-B-44-26580, 43-17922, 43-17926, 43-3166, 48-20785, French Patent 202,588, Belgian Patent 773,459, JP-A-48-01118, etc. Among these compounds, anionic surfactants having a sulfone group such as sulfonated succinate esters and alkylbenzenesulfonates are particularly preferred. Compounds useful as antistats are described in patents such as JP-B-46-24159, JP-A-48-89979, U.S. Pat. Nos. 2,882,157, 2,972,535, JP-A-48-20785, 48-43130, 48-90391, JP-B-46-24159, 46-39312, 48-43809, JP-A-47-33627, etc.

Coating solutions to be used in producing the silver halide photographic material of the present invention preferably have a pH in the range of 5.3–7.5. When a plurality of layers are to be formed in superposition, the coating solution prepared by mixing the coating solutions for the respective layers in their predetermined proportions preferably have a pH within the above-stated range of 5.3–7.5 If the pH is lower than 5.3, the applied coating will harden at an unacceptably slow speed, whereas the photographic performance of the final product will be adversely affected if the pH is higher than 7.5.

Constituent layers of the light-sensitive material may incorporate a matting agent selected from among the following: the particles of inorganic materials such as silica as described in Swiss Patent 330,158, a glass powder as described in French Patent 1,296,955, alkaline earth metals or carbonates of cadmium, zinc, etc. as described in British Patent 1,173,181; and the particles of organic materials such as starch as described in U.S. Pat. No. 2,322,037, as well as starch derivatives as described in Belgian Patent 625,451 or British Patent 981,198, polyvinyl alcohol as described in JP-B-44-3643, polystyrene or polymethyl methacrylate as described in Swiss Patent 330,158, polyacrylonitrile as described in U.S. Pat. No. 3,079,257, and polycarbonates as described in U.S. Pat. No. 3,022,169.

Constituent layers of the light-sensitive material may also contain a slip agent selected from among the following: higher aliphatic acid esters of higher alcohols as described in U.S. Pat. Nos. 2,588,756 and 3,121,060; casein as described in U.S. Pat. No. 3,295,979; calcium salts of higher aliphatic acids as described in British Patent 1,263,722; and silicon compounds as described in British Patent 1,313,384 and U.S. Pat. Nos. 3,042,522 and 3,489,567. Dispersions of liquid paraffins can also be used as slip agents.

Depending upon a specific object, the light-sensitive material of the present invention may incorporate various additives. A detailed description of useful additives is given in Research Disclosure, No. 17643 (December, 1978) and ibid., No. 18716 (November, 1979) and the relevant portion of the description is summarized in the table below.

| Additive | RD 17643 | RD 18716 |
| --- | --- | --- |
| 1. Chemical sensitizer | p. 23 | p. 648, right col. |
| 2. Sensitivity improver |  | " |
| 3. Spectral sensitizer Supersensitizer | pp. 23–24 | p. 648, right col. to p. 649, right col. |
| 4. Brightener | p. 24 |  |
| 5. Antifoggant Stabilizer | pp. 24–25 | p. 649, right col. |
| 6. Light absorber Filter dye UV absorber | pp. 25–26 | p. 649, right col. to p. 650, left col. |
| 7. Antistain agent | p. 25 right col. | p. 650, left and right col. |
| 8. Dye image stabilizer | p. 25 |  |
| 9. Hardener | p. 26 | p. 651, left col. |
| 10. Binder | p. 26 | " |
| 11. Plasticizer Lubricant | p. 27 | p. 650, right col. |
| 12. Coating aid Surfactant | pp. 26–27 | " |
| 13. Antistat | p. 27 | " |

In the silver halide photographic materials to be processed by the method of the present invention, emulsion layers and other constituent layers may be embodied by being coated on either one or both sides of flexible supports that are commonly employed in photographic materials. Useful flexible supports include: films made of semisynthetic or synthetic polymers such as cellulose nitrate, cellulose acetate, cellulose acetate butyrate, polystyrene, polyvinyl chloride, polyethylene terephthalate and polycarbonates; and paper coated or laminated with baryta layer or α-olefinic polymers (e.g. polyethylene, polypropylene and ethylene-butene copolymer). These supports may be tinted with dyes or pigments. They may be rendered black for light-shielding purposes. The surface of these supports is normally subbed in order to provide improved adhesion to emulsion layers or other constituent layers. For preferred methods of subbing, reference may be had to JP-A-52-104913, 59-8949, 59-19940 and 59-11941.

Before or after subbing, the surface of the supports may be subjected to corona discharge treatment, uv irradiation, flame treatment or some other appropriate treatment.

Photographic emulsion layers and other hydrophilic colloidal layers that are to make up the silver halide photographic material to be processed by the present invention may be applied onto the support or other layers by a variety of coating techniques, such as dip coating, roller coating, curtain coating and extrusion coating.

The development, fixing, washing and/or stabilizing, and drying steps to be performed in the method of the present invention are described below.

While various developing agents may be incorporated in the black-and-white developing solution to be used in the present invention, the combinations of dihydroxy-benzenes and 1-phenyl-3-pyrazolidones are most preferred. Needless to say, p-aminophenolic developing agents may also be used.

Exemplary dihydroxybenzene developing agents include hydroquinone, chlorohydroquinone, bromohydroquinone, isopropylhydroquinone, methylhydroquinone, 2,3-dichloro-hydroquinone, 2,5-dichlorohydroquinone, 2,3-dibromo-hydroquinone, and 2,5-dimethylhdroquinone, with hydroquinone being particularly preferred.

Exemplary 1-phenyl-3-pyrazolidone compounds and derivatives thereof that can be used as developing agents in the present invention include 1-phenyl-4,4-dimethyl-3-pyrazolidone, 1-pbenyl-4-methyl-4-hydroxymethyl-3-pyrazolidone and 1-phenyl-4,4-dihydroxymethyl-3-pyrazolidone.

Exemplary p-aminophenolic developing agents that can be used in the present invention include N-methyl-p-aminophenol, p-aminophenol, N-(B-hydroxyethyl)-p-aminophenol, N-(4-hydroxyphenyl)glycine, 2-methyl-p-aminophenol and p-benzylaminophenol, with N-methyl-p-aminophenol being particularly preferred.

The developing agents described above are preferably used in amounts ranging from 0.01 to 1.2 moles per liter.

Exemplary sulfites that can be used as preservatives in the present invention include sodium sulfite, potassium sulfite, lithium sulfite, ammonium sulfite, sodium bisulfite, potassium metabisulfite and formaldehyde sodium bisulfite. These sulfites are preferably used in amounts of at least 0.2 moles per liter, with 0.4 moles/L or more being particularly preferred. The upper limit is preferably no more than 2.5 moles/L.

The developing solution to be used in the present invention preferably has a pH in the range of 9 to 13, with the range of from 10 to 12 being more preferred.

Alkali agents used for pH setting include pH adjusters such as sodium hydroxide, potassium hydroxide, sodium carbonate, potassium carbonate, sodium tertiary phosphate and potassium tertiary phosphate.

Buffering agents may also be used and they include borates (see JP-A-61-28708), saccharose, acetoxime and 5-sulfosalicylic acid (for these three, see JP-A-60-93439), phosphates and carbonates.

Other additives that may be incorporated include: development restrainers such as sodium bromide, potassium bromide and potassium iodide; organic solvents such as ethylene glycol, diethylene glycol, triethylene glycol, dimethylformamide, methyl cellosolve, hexyleen glycol, ethanol and methanol; and antifoggants as exemplified by mercapto compounds such as 1-pehnyl-5-mercaptotetrazole and sodium 2-mercaptobenzimidazole-5-sulfonate, indazole compounds such as 5-nitroindazole, and benzotriazole compounds such as 5-methyl benzotriazole. If necessary, tone modifiers, surfactants, antifoaming agents, water softeners and amino compounds (see JP-A-56-106244) may also be contained.

In accordance with the present invention, the developing solution may contain an anti-silver stain agent such as the compound described in JP-A-56-24347. the developing solution may also contain an amino compound such as the alkanolamine described in JP-A-56-106244.

Other developing solutions that may be employed in the present invention are described in such references as L.F.A. Mason, "Photographic Processing Chemistry", The Focal Press, pp. 226-229, 1966, and U.S. Pat. Nos. 2,193,015, 2,592,364 and JP-A-48-64933.

The term "development time" as used herein means the time required for the light-sensitive material of interest being immersed in the solution in the development tank of an automatic processor to be immersed in the fixing bath, and the term "fixing time" as used herein means the time required for the light-sensitive material immersed in the solution in the fixing tank to be immersed in the solution in the washing water tank (or stabilizing tank.

The term "washing time" means the time for which the light-sensitive material is immersed in the solution in the washing water tank.

The term "drying time" means the time for which the light-sensitive material is in the drying zone of the automatic processor where hot air having a temperature of ca. 35°-100° C., preferably 40°-80° C., is blown against the material.

The development temperature and time are respectively from ca. 25° to 50° C. and 15 seconds or shorter, with the preferred ranges being from 30° to 40° C. and from 6 to 15 seconds.

The fixing bath is composed of an aqueous solution containing a thiosulfate, which has a pH of at least 3.8, preferably in the range of 4.2-5.5.

Illustrative fixing agents are sodium thiosulfate and ammonium thiosulfate. Since thiosulfate ion and ammonium ion are essential components of fixing agents, ammonium thiosulfate is particularly preferred from the viewpoint of fixing speed. The amount of fixing agents used is properly adjustable and is generally within the range of from ca. 0.1 to ca. 6 moles/L.

Fixing baths may contain water-soluble aluminum salts that work as hardeners and illustrative water-soluble aluminum salts are aluminum chloride, aluminum sulfate and potassium alum.

Fixing baths may contain tartaric acid, citric acid or derivatives thereof either on their own or as admixtures. It is effective for these compounds to be contained in an amount of at least 0.005 moles per liter of the fixing bath, with the range of 0.01-0.03 moles/L being particularly preferred. Specific examples of tartaric acid, citric acid and derivatives thereof include tartaric acid, potassium tartrate, sodium tartrate, potassium sodium tartrate, citric acid, sodium citrate, potassium citrate, lithium citrate and ammonium citrate.

If desired, the fixing bath may also contain a preservative (e.g. sulfite or bisulfite), a pH buffer (e.g. acetic acid or nitric acid), a pH adjuster (e.g. sulfuric acid), a chelant capable of softening hard water, or the compound described in Japanese Patent Application No. 60-213562.

The fixing temperature and time are preferably within the ranges of from ca. 20° to ca. 50° C. and from 6 seconds to 1 minute, more preferably within the ranges of 30°-40° C. and 6-30 seconds, with the ranges of 30°-40° C. and 6-15 seconds being particularly preferred.

If a concentrated fixing solution is additionally supplied together with diluting water therefor as the light-sensitive material is processed with an automatic processor by the method of the present invention, said concentrated fixing solution is most preferably composed of a single component as in the case of the developing solution. A single-component concentrated fixing solution can remain stable at a pH of 4.5 and above, more preferably at a pH of 4.65 and above. If the pH is less than 4.5, the thiosulfate will be decomposed to become eventually sulfidized, particularly in the case where said solution is left to stand for a prolonged period before the fixing solution is put to actual use. If the pH is 4.5 and above, only a limited amount of sulfurous acid gas will evolve and the working environment will remain clean. There is no strict limitation on the maximum level of pH but if fixing is performed at excessively high pH, the hydrophilic colloidal layers of the light-sensitive material will have an unduly high pH even if it is subsequently washed with water and the layers will swell so greatly as to increase the water load. Therefore, the upper limit of the pH of the fixing solution is generally set at about 7. With fixing solutions that harden the film by means of aluminum salts, the upper limit of its pH should be no higher than 5.5 in order to prevent precipitation of the aluminum salts.

In implementing the method of the present invention, either one of the developing and fixing solutions may be a so-called "working solution" that does not require diluting water of the type described above and which hence may be supplied undiluted.

The amounts in which the respective concentrated solutions are supplied into the associated processing tanks and the proportions in which they are mixed with diluting water may be varied widely depending upon the compositions of the respective concentrated solutions. Normally, the ratio of each concentrated solution to diluting water is in the range of from 1:0 to 1:8, and the total amount of each solution (i.e. the developing or fixing solution) preferably ranges from 50 ml to 1,500 ml per square meter of the light-sensitive material.

In the method of the present invention, the fixed light-sensitive material is then subjected to a washing and/or stabilizing treatment, which may be carried out by every method known in the art. Water containing various additives known in the art may be used as washing water or the stabilizing solution. For instance, if water that has been rendered mold-proof is used as washing water or the stabilizing solution, not only does it become possible to reduce the water supply (i.e. no more than 3 liters of water need be supplied per square meter of the light-sensitive material) but also the piping for the automatic processor can be simplified. In addition, the number of stock tanks can be reduced. Stated more specifically, the diluting water for conditioning the developing and fixing solutions and the washing water or stabilizing solution can be supplied from a single common stock tank, thus realizing further reduction in the size of the automatic processor.

If water rendered mold-proof is used in combination with the washing water or stabilizing solution, the buildup of scale in the latter can be prevented, thereby accomplishing a reduction in the water supply by 0-3 liters, preferably 0-1 liter, per square meter of the light-sensitive material. The "zero" replenishment refers to the case where the washing water in the wash tank is not replenished at all except for the compensation for the loss that occurs by such reason as evaporation with time.

The classical method for reducing the amount of water to be supplied additionally is by employing a countercurrent system through two, three or more stages. If this multi-stage countercurrent system is applied to the present invention, the light-sensitive material in the fixing solution will be brought through successive contact stages in the "clean" direction, namely, toward the processing solution that is less contaminated by the fixing solution, thereby accomplishing much more efficient washing. According to this technique thiosulfates and other labile compounds will be effectively removed to further reduce the possibility of color change or fading, thus providing even marked stabilizing effects. As another advantage, the amount of washing water that is required is appreciably reduced as compared to the prior art.

If washing is to be effected with a small amount of wash water, it is preferred to employ a washing tank provided with squeeze rollers as described in Japanese Patent Application No. 60-172968.

An overflow will emerge from the washing or stabilizing bath when it is replenished with the mold-proof water as required for the processing of the light-sensitive material. As described in JP-A-60-235133, part or all of this overflow may be recycled to the previous step as a processing solution having the fixing capability. By so doing, the stock water that is necessary can be reduced and in addition, the amount of effluent can also be reduced.

Water can be rendered mold-proof by various methods including the uv irradiation described {n JP-A-60-263939, the method using a magnetic field as described in JP-A-60-263940, the method which produces pure water by means of an ion-exchange resin as described in JP-A-61-131632, and the method which employs a biocide as described in Japanese Patent Application Nos. 60-253807, 60-295894, 61-63030 and 61-51396.

These methods may be employed in combination with a biocide, mold inhibitor, a surfactant of the like as described in L.E. West, "Water Quality criteria", Photo. Sci. & Eng., Vol. 9, No. 6 (1965), M.W.Beach, "Microbiological Growths in Motion-Picture Processing", SMPTE Journal, Vol. 85 (1976), R.O. Deegan, "Photo Processing Wash Water Biocides", J. Imaging Tech., Vol. 10, No. 6 (1984), as well as JP-A-57-8542, 57-58143, 58-105145, 57-132146, 58-18631, 57-97530 and 57-157244.

The washing bath may further contain one or more of the following compounds as microbiocides: isothiazoline compounds of the type described in R.T Kreiman, J. Imaging Tech., 10, 6, p. 242 (1984), isothiazoline compounds of the type described in Research Disclosures, Vol. 205, No. 20526, May 1981, isothlazoline compounds of the type described in Research Disclosure, ibid., Vol. 228, No. 22845, April 1983, and the compounds described in Japanese Patent Application No. 61-51396.

Specific examples of mold inhibitors that can be used include phenol, 4-chlorophenol, pentachlorophenol, cresol, o-phenylphenol, chlorophene, dichlorophene, formaldehyde, glutaraldehyde, chloroacetamide, p-hydroxybenzoic acid esters, 2-(4-thiazoline)-benzimidazole, benzisothiazolin-3-one, dodecyl-benzyl-dimethylammonium chloride, N-(fluorodichloromethylthio)-phthalimide, and 2,4,4'-trichloro-2'-hydroxydiphenylether.

If the water preserved in a water stock tank after being subjected to the mold-preventing means is used in common as a diluting water and a washing water for stock processing solutions such as the above-mentioned developer and fixing solution, this is desirable in the point that the space can be reduced. However, the diluting water and washing water (or stabilizing solution) subjected to mold-inhibiting means may be divided and preserved in separate tanks, respectively, or either one alone may be taken directly from water lines.

When the water is divided and preserved in separate tanks, various additives may be incorporated in the washing water (or stabilizing solution) subjected to mold-preventing means as in the present invention.

For example, chelate compounds having a chelate stability log K value of 10 or more with aluminium may be incorporated. These are effective in preventing the formation of white precipitation in the washing water when an aluminium compound is contained as a hardener in the fixing solution.

Specific examples of the chelating agent include ethylenediaminetetraacetic acid (log K, 16.1; hereinafter the same), cyclohexandiaminetetraacetic acid (17.6), diaminopropanoletetraacetic acid (13.8), diethylenetriaminepentaacetic acid (18.4), triethylenetetraminehexaacetic acid (19.7), etc., as well as sodium, potassium salts and ammonium salts thereof, the addition amount of each being preferably 0.01 to 10 g/1, more preferably 0.1 to 3 g/1.

Besides silver image stabilizers, various surfactants may be incorporated in the wash water in order to prevent the occurrence of water spots. The surfactants to be used for this purpose may be cationic, anionic, nonionic or amphoteric. Specific examples of such surfactants are described in "Kaimenkasseizai Handbook (Surfactant Handbook)" published by Kogaku Tosho.

Various compounds may be incorporated into the stabilizing bath for image stabilizing purposes. Typical examples of compounds useful for this purpose include a variety of buffering agents for adjusting the pH of hydrophilic colloidal layes (to the range, for example, of 3-8) as illustrated by borates, metaborates, borax, phosphates, carbonates, potassium hydroxide, sodium hydroxide, aqueous ammonia, monocarboxylic acids, dicarboxylic acids and poluycarboxylic acids (which may be used in combination), as well as aldehydes such as formaldehyde. Other additives that may be used include chelants, bactericides (e.g. thiazoles, isothiazoles, halo-phenols, sulfanylamides and benzotriazole), surfactants, brighteners and hardeners. Compounds for achieving the same or different purposes may be used as admixtures.

For the purpose of improving the storage stability of image, it is perferred to add various ammonium salts (e.g. ammonium chloride, ammonium nitrate, ammonium sulfate, ammonium phosphate, ammonium sulfite and ammonium thiosulfate) to processing solutions as agents to modify the pH of hydrophillic colloidal layers.

The temperature of the wash or stabilizing bath used in the method described above and the duration of time for the washing or stabilizing step are preferably in the ranges of from 0° to 50° C. and from 6 seconds to 1 minute, more preferably in the ranges of 15°–40° C. and 6–30 seconds, with the ranges of 15°–40° C. and 6–15 seconds being particularly preferred.

According to the method of the present invention, the developed, fixed and washed photographic material is dried after passing through the squeezing step in which the wash water is removed by the squeeze roller method. The drying is effected at a temperature in the range of ca. 40 - ca. 100° C. The drying time is properly variable depending on the environmental condition and the duration of from about 5 seconds to 1 minute will normally suffice. More preferably, the drying is performed at 40°-80° C. for a period of ca. 5-30 seconds.

The present invention offers the added advantage that the time required to dry up photographic materials can be shortened in proportion as the percentage of their swelling is reduced.

According to the method of the present invention, the "drying-to-dry" processing time including development, fixing, washing and drying steps can be completed within 100 seconds, preferably within 60 seconds, more preferably within 50 seconds. The term "dry-to-dry" as used hereinabove means the time from the moment the tip of the photographic material to be processed enters an automatic processor at the film inlet to the moment said tip emerges from the processor after processing.

The following example is provided for the purpose of further illustrating the present invention but is in no way to be taken as limiting.

EXAMPLE 1

Preparing Coating Solution for Application of the Lower Layer of Back Coating After dissolving 500 g of gelatin in 8 L of water, a dye within the scope of the present invention (for its name, see Table 1) was added. Further, 20 g of saponin (surfactant), 1 g of another surfactant (for its name, see Table 1), 20 g of a butyl acrylatevinylidene chloride copolymer (polymer latex), 2.5 g of a styrenemaleic anhydride copolymer (thickener) and 2 g of glyoxal (hardener) were added.

Preparing Coating Solution for Application of the Upper Layer of Back Coating After dissolving 400 g of gelatin in 600 ml of water, 20 g of particulate polymethyl methacrylate (matting agent, average particle size of 4 μm) and 3 g of a surfactant (for its name, see Table 1) were added. Preparing coating solution for application of emulsion layer:

To a solution consisting of gelatin, sodium chloride and water and which was held at 40° C., an aqueous solution of silver nitrate and an aqueous solution of a mixture of potassium bromide and sodium chloride were added by the double-jet method. The aqueous mixture of potassium bromide and sodium chloride had potassium hexachloroiridate and hexabromorhodate contained in respective amounts of $2 \times 10^{-6}$ moles and $4 \times 10^{-7}$ moles per mole of silver halide. Silver chlorobromide (35 mol % AgBr) grains (spread of size distribution, 9%; cubic crystal; grain size, 0.25 μm) were prepared with the pH and pAg being held at 3.0 and 7.7, respectively. After the pH was returned to 5.9, the grains were desalted in the usual manner.

The resulting emulsion was sulfur-sensitized, followed by addition of spectral sensitizer (A) (see below) in an amount of 60 mg per mole of silver halide. Thereafter, the ripening was stopped by adding 70 mg of 1-phenyl-5-mercaptotetrazole, 1.2 g of 4-hydroxy-6-1,3,3a,7-tetrazaindene and gelatin per mole of silver halide. Further, 4 g of hydroquinone, 3 g of potassium bromide, 5 g of saponin, 2 g of a styrene-maleic acid polymer (thickener), 3 g of a high-molecular weight polymer latex of ethyl acrylate, and hardeners (formaldehyde and 1-hydroxy-3,5-dichlorotriazine sodium salt) were added.

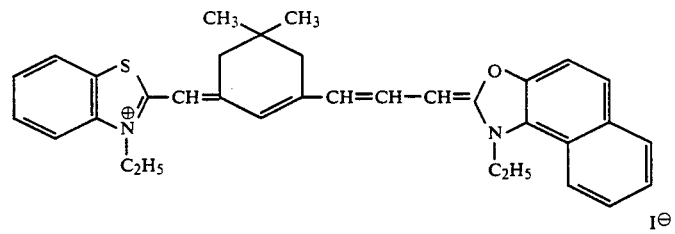

Preparing Coating Solution for Emulsion Layer Protective Film

To an aqueous solution of gelatin (500 g), 10 g of potassium bromide was added, followed by addition of a 1% aqueous solution (4 g) of sodium 1-decyl-2-(3-isopentyl}succinate-2-sulfonate (spreading agent). Thereafter, 100 g of amorphous silica having an average particle size of 5 μm was dispersed in the solution.

Using the first and second coating layers, the lower and upper layers of back coating were simultaneously formed on a subbed polyethylene terephthalate base 100 μm thick to give a certain gelatin deposit (for its value, see Table 1). Subsequently, using the third and fourth coating layers, an emulsion layer and a protective layer were formed on the other side of the base to give a silver deposit of 3.8 g/m² The gelatin deposit was 1.5 g/m² in the emulsion layer and 1.0 g/m² in the protective layer.

Samples thus prepared were processed with a conventional roller type automatic processor using a developing and a fixing solution having the compositions to be shown below. For the same processing time, the line speed was varied by adjusting the depth of an associated vessel and the number of rollers. The processing conditions were as follows:

| Steps | Processing scheme | |
|---|---|---|
| | Temperature (°C.) | Time (sec) |
| Development | 38 | 12 |
| Fixing | 36 | 10 |
| Washing | ambient | 8 |
| Drying | 50 | 10 |
| | (Dry-to-dry) | 45 |

The processed samples were visually evaluated for color remnant by the following criteria: 1-4, unacceptable; 5-10, acceptable (10, excellent). As one can see from Table 1, the samples processed by the method of the present invention were satisfactory in terms of color remnant.

TABLE 1

| | Sample No. | Dye (I) | Surfactant Lower layer | Surfactant Upper layer | Gelatin (g/m²) Lower layer | Gelatin (g/m²) Upper layer | Line speed (mm/min) | Color remnant |
|---|---|---|---|---|---|---|---|---|
| Comparison | 1 | 6 | a | a | 2.6 | 1.3 | 1800 | 4 |
| | 2 | 6 | b | b | 2.6 | 1.3 | 1800 | 3 |
| Invention | 3 | 6 | 3 | 3 | 2.6 | 1.3 | 1800 | 8 |
| | 4 | 6 | 10 | 10 | 2.6 | 1.3 | 1800 | 9 |
| | 5 | 6 | 12 | 12 | 2.6 | 1.3 | 1800 | 8 |
| | 6 | 6 | 14 | 14 | 2.6 | 1.3 | 1800 | 8 |
| | 7 | 6 | 2 | 14 | 2.6 | 1.3 | 1800 | 9 |
| | 8 | 11 | 12 | 12 | 2.6 | 1.3 | 1800 | 8 |
| | 9 | 13 | 12 | 12 | 2.6 | 1.3 | 1800 | 10 |
| | 10 | 17 | 12 | 12 | 2.6 | 1.3 | 1800 | 9 |
| | 11 | 18 | 12 | 12 | 2.6 | 1.3 | 1800 | 8 |
| | 12 | 21 | 12 | 12 | 2.6 | 1.3 | 1800 | 8 |
| | 13 | 6 | 14 | 14 | 2.3 | 1.0 | 1800 | 9 |
| Comparison | 14 | 6 | 10 | 10 | 2.6 | 1.3 | 1000 | 4 |
| Invention | 15 | 6 | 10 | 10 | 2.6 | 1.3 | 1500 | 6 |
| | 16 | 6 | 10 | 10 | 2.6 | 1.3 | 1600 | 7 |
| | 17 | 6 | 10 | 10 | 2.6 | 1.3 | 2400 | 10 |
| Comparison | 18 | 6 | 12 | 12 | 2.3 | 1.0 | 1000 | 3 |
| Invention | 19 | 6 | 12 | 12 | 2.3 | 1.0 | 1500 | 5 |
| | 20 | 6 | 12 | 12 | 2.3 | 1.0 | 1600 | 7 |
| | 21 | 6 | 12 | 12 | 2.3 | 1.0 | 2400 | 10 |

Note:
The "lower layer" and "upper layer" were those of the back coating.

The surfactants used in the comparative samples had the following structural formulas:

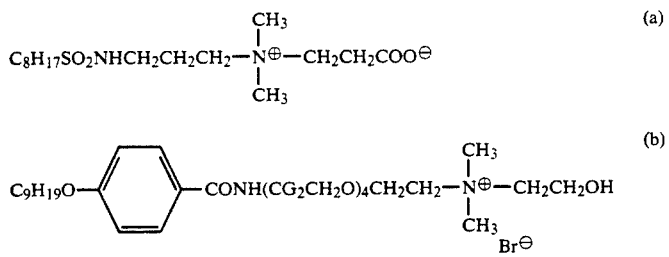

(a)

$$C_8H_{17}SO_2NHCH_2CH_2CH_2-\overset{\overset{CH_3}{|}}{\underset{\underset{CH_3}{|}}{N^{\oplus}}}-CH_2CH_2COO^{\ominus}$$

(b)

$$C_9H_{19}O-\text{C}_6\text{H}_4-CONH(CG_2CH_2O)_4CH_2CH_2-\overset{\overset{CH_3}{|}}{\underset{\underset{CH_3}{|}}{N^{\oplus}}}-CH_2CH_2OH \quad Br^{\ominus}$$

Developer's Composition

Composition (A):

| | |
|---|---|
| Pure water (deionized water) | 150 ml |
| Ethylenediaminetetraacetic acid disodium salt | 2 g |
| Diethylene glycol | 50 g |
| Potassium sulfite (55% w/v aq. sol.) | 100 ml |
| Potassium carbonate | 50 g |
| Hydroquinone | 15 g |
| 5-Methylbenzotriazole | 200 mg |
| 1-Phenyl-5-mercaptotetrazole | 30 mg |
| Potassium hydroxide | q.s. to provide pH of 11.5 after use |
| Potassium bromide | 3 g |

Composition (B):

| | |
|---|---|
| Pure water (deionized water) | 3 ml |
| Diethylene glycol | 50 g |
| Diethylamino-1,2-propanediol | 15 g |
| Ethylenediaminetetraaceticacid disodium salt | 25 mg |
| Acetic acid (90% w/v aq. sol.) | 0.3 ml |
| 5-Nitroindazole | 110 mg |
| 1-Phenyl-3-pyrazolidone | 500 mg |

Just prior to the use of developing solution, composition (A) and composition (B) were successively dissolved in 500 ml of water and the mixture was worked up to 1,000 ml.

Fixing Solution's Recipe

Composition (A):

| | |
|---|---|
| Ammonium thiosulfate (72.5% w/v aq. sol.) | 240 ml |
| Sodium sulfite | 17 g |
| Sodium acetate (3H₂O) | 6.5 g |
| Boric acid | 6 g |
| Sodium citrate (3H₂O) | 8 g |
| Acetic acid (90% w/v aq. sol.) | 13.6 ml |

Composition (B):

| | |
|---|---|
| Pure water (deionized water) | 17 ml |
| Sulfuric acid (50% w/v aq. sol.) | 4.7 g |
| Aluminum sulfate (aq. sol. containing 8.1% w/v of Al₂O₃) | 26.5 g |

Just prior to the use of fixing solution, composition (A) and composition (B) were successively dissolved in 500 ml or water and the mixture was worked up to 1,000 ml. The so prepared fixing solution and a pH of about 4.3.

The present invention offers a method by which photographic materials can be processed with great rapidity without causing either substantial or uneven color remnant.

What is claimed is:

1. A method of processing a silver halide photographic material that has been exposed to light and that has at least one light sensitive silver halide emulsion layer on one side of a support and which has at least one back coating layer on the other side of the support, wherein said silver halide photographic material contains:

at least one dye represented by the following general formula (I):

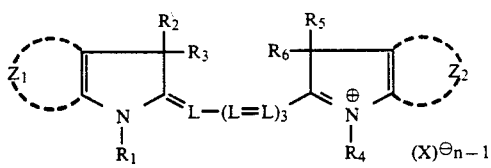

wherein $R_1$, $R_2$, $R_3$, $R_4$, $R_5$ and $R_6$ each independently represents a substituted or unsubstituted alkyl group; $Z_1$ and $Z_2$ each represents the nonmetallic atomic group necessary to form a substituted or unsubstituted benzo or naphtho condensed ring, provided that $R_1$-$R_6$ and $Z_1$ and $Z_2$ each represents a group that enables the dye molecule t have at least four acid groups; L is a substituted or unsubstituted methine group; $X^\ominus$ is an anion; n is 1 or 2, provided that the dye forms an intramolecular salt when n is 1;

and at least one anionic surfactant selected from the group consisting of the following:

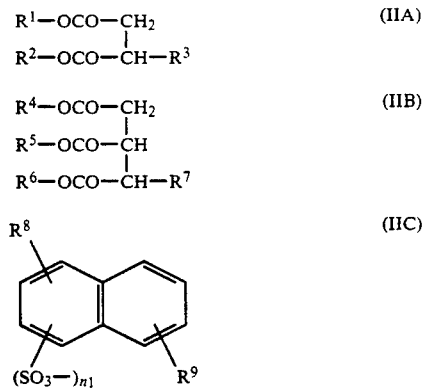

wherein $R^1$, Rhu 2, $R^4$, $R^5$, $R^6$, $R^8$, $R^9$ and $R^{10}$ are each a halogen atom or a substituted or unsubstituted alkyl group; $R^3$ and $R^7$ are each an alkali metal salt of a carboxyl group, a sulfo group or a phosphonic acid group, $n_1$ represents an integer of 1-3;

comprising the steps in the order of:

(a) developing;
(b) fixing; and
(c) washing and/or stabilizing wherein the steps (a)-(c) are performed within a time period of 40 seconds and at a line speed of at least 2,000 mm/min.

2. A method according to claim 1 wherein at least four of $R_1$-$R_6$ as well as $Z_1$ and $Z_2$ have an acid substituent.

3. A method according to claim 2 wherein said acid substituent is a sulfonic acid or carboxylic acid group.

4. A method according to claim 1 wherein each of $R_1$-$R_6$ as well as $Z_1$ and $Z_2$ is a group that enables the dye molecule to have four sulfonic acid groups.

5. A method according to claim 1 wherein each of $R_1$-$R_6$ is a lower alkyl group having 1-5 carbon atoms.

6. A method according to claim 1 wherein each of $R_1$ and $R_4$ is a lower alkyl group with 1-5 carbon atoms which has a sulfonic acid group.

7. A method according to claim 1 wherein each of $Z_1$ and $Z_2$ represents the nonmetallic atomic group necessary to form a benzo or naphtho condensed ring which has at least one substituent selected from the group consisting of a sulfonic acid group, a carboxylic acid group, a hydroxyl group, a halogen atom, a cyano group, a substituted amino group, and a substituted or unsubstituted alkyl group of $C_{1-5}$ that is bonded to the ring either directly or via a divalent linkage.

8. A method according to claim 7 wherein said divalent linkage is selected from the group consisting of —O—, —NHCO—, —NHSO$_2$—, —NHCOO—, —NHCONH—, —COO—, —CO— and —SO$_2$—.

9. A method according to claim 1 wherein the dye represented by the general formula (I) is contained in the silver halide photographic material in an amount of $10^{-3}$ to 0.5 g/m$^2$.

10. A method according to claim 1 wherein the dye represented by the general formula (I) is contained in the silver halide photographic material in an amount of $10^{-2}$ to 0.2 g/m$^2$.

11. A method according to claim 1 wherein the dye represented by the general formula (I) is contained in at least one silver halide emulsion layer.

12. A method according to claim 1 wherein the dye represented by the general formula (I) is contained in at least one layer between the support and a silver halide emulsion layer or in at least one back coating layer.

13. A method according to claim 1 wherein the dye represented by the general formula (I) is contained in at least one layer that is more remote from the support than a silver halide emulsion layer.

14. A method according to claim 1 wherein the side of said silver halide photographic material that contains the dye represented by the general formula (I) has a gelatin content of no more than 3.9 g/m$^2$.

15. A method according to claim 1 wherein the side of said silver halide photographic material that contains the dye represented by the general formula (I) has a gelatin content of no more than 3.5 g/m$^2$.

16. A method according to claim 1 wherein said anionic surfactant is contained in the silver halide photographic material in an amount of $10^{-4}$-1 g/m$^2$.

17. A method according to claim 1 wherein said anionic surfactant is contained in the silver halide photographic material in an amount of $10^{-3}$-0.1 g/m$^2$.

18. A method according to claim 1 wherein said anionic surfactant is contained in at least one layer on the side of the support on which at least one layer containing a dye of the general formula [I] is provided.

19. A method according to claim 1 wherein the development step is performed at a temperature of from about 25° to 50° C. for a period not longer than 15 seconds.

20. A method according to claim 1 wherein the development step is performed at a temperature of from about 30° to 40° C. for a period of 6-15 seconds.

21. A method according to claim 1 wherein the fixing step is performed at a temperature of 30°-40° C. for a period of 6-30 seconds.

22. A method according to claim 1 wherein the fixing step is performed at a temperature of 30°-40° C. for a period of 6-15 seconds.

23. A method according to claim 1 wherein the washing or stabilizing step is performed at a temperature of 15°-40° C. for a period of 6-30 seconds.

24. A method according to claim 1 wherein the washing or stabilizing step is performed at a temperature of 15°-40° C. for a period of 6-15 seconds.

25. A method according to claim 1 wherein the dry-to-dry processing time is within 100 seconds.

26. A method according to claim 1 wherein the dry-to-dry processing time is within 60 seconds.

27. A method according to claim 1 wherein the dry-to-dry processing time is within 50 seconds.

* * * * *

UNITED STATES PATENT AND TRADEMARK OFFICE
CERTIFICATE OF CORRECTION

PATENT NO. : 5,153,112
DATED : October 06, 1992
INVENTOR(S) : Yoshida Kazuhiro et al.

It is certified that error appears in the above-identified patent and that said Letters Patent is hereby corrected as shown below:

Claim 1, Column 29, Line 19 change "t" to --to--;

Claim 1, Column 29, Line 44 change "Rhu2" to --$R^2$--.

Claim 18, Column 30, Line 51 change "[I]is" to --[I] is--.

Signed and Sealed this

Fourth Day of January, 1994

BRUCE LEHMAN

*Attest:*

*Attesting Officer*  Commissioner of Patents and Trademarks